United States Patent [19]

Sebenik et al.

[11] 4,035,169

[45] * July 12, 1977

[54] PROCESS FOR THE PURIFICATION OF ALUMINUM CHLORIDE

[75] Inventors: Roger Frank Sebenik; Alfred Lippman, both of Metairie, La.

[73] Assignee: Toth Aluminum, New Orleans, La.

[ * ] Notice: The portion of the term of this patent subsequent to Feb. 17, 1993, has been disclaimed.

[21] Appl. No.: 631,316

[22] Filed: Nov. 12, 1975

Related U.S. Application Data

[63] Continuation-in-part of Ser. No. 422,846, Dec. 7, 1973, Pat. No. 3,938,969.

[51] Int. Cl.$^2$ .................. B01D 47/00; C01F 7/48
[52] U.S. Cl. ...................... 55/71; 55/72; 55/84; 423/210; 423/495
[58] Field of Search ............ 55/71, 72, 82, 84; 423/135, 215, 463, 495, 210, 465; 75/202, 203

[56] References Cited

U.S. PATENT DOCUMENTS 3,938,969  2/1976  Sebenik et al. ................ 55/71

Primary Examiner—Frank A. Spear, Jr.
Assistant Examiner—Ferris H. Lander

[57] ABSTRACT

A process is disclosed for collecting and purifying aluminum chloride from gases like those produced from the chlorination of bauxite, clay and other aluminous ores. The method comprises first dissolving the aluminum chloride at about atmospheric pressure in a molten salt solvent in which most of the other principal metal chloride vapors, like $SiCl_4$ and $TiCl_4$, are substantially insoluble; then vaporizing and separating the $AlCl_3$ to produce a purified liquid product. This process eliminates the previous use of costly and/or hazardous compressors and scraped-wall condensers and provides for economical recovery of purified liquid aluminum chloride.

12 Claims, 10 Drawing Figures

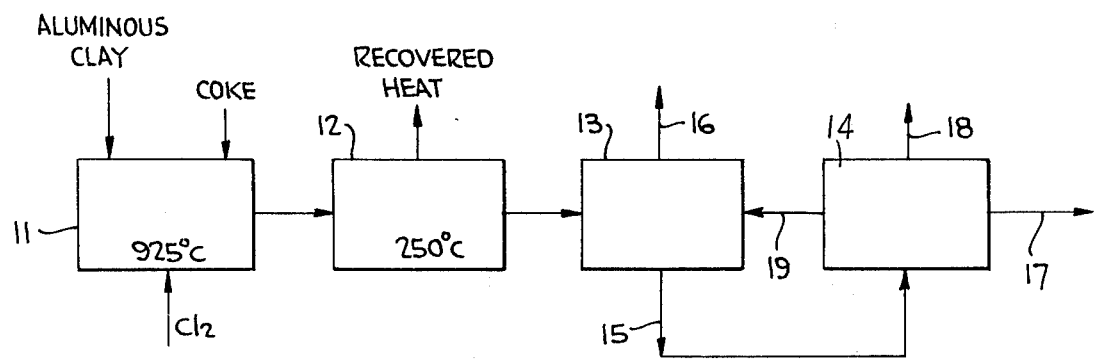
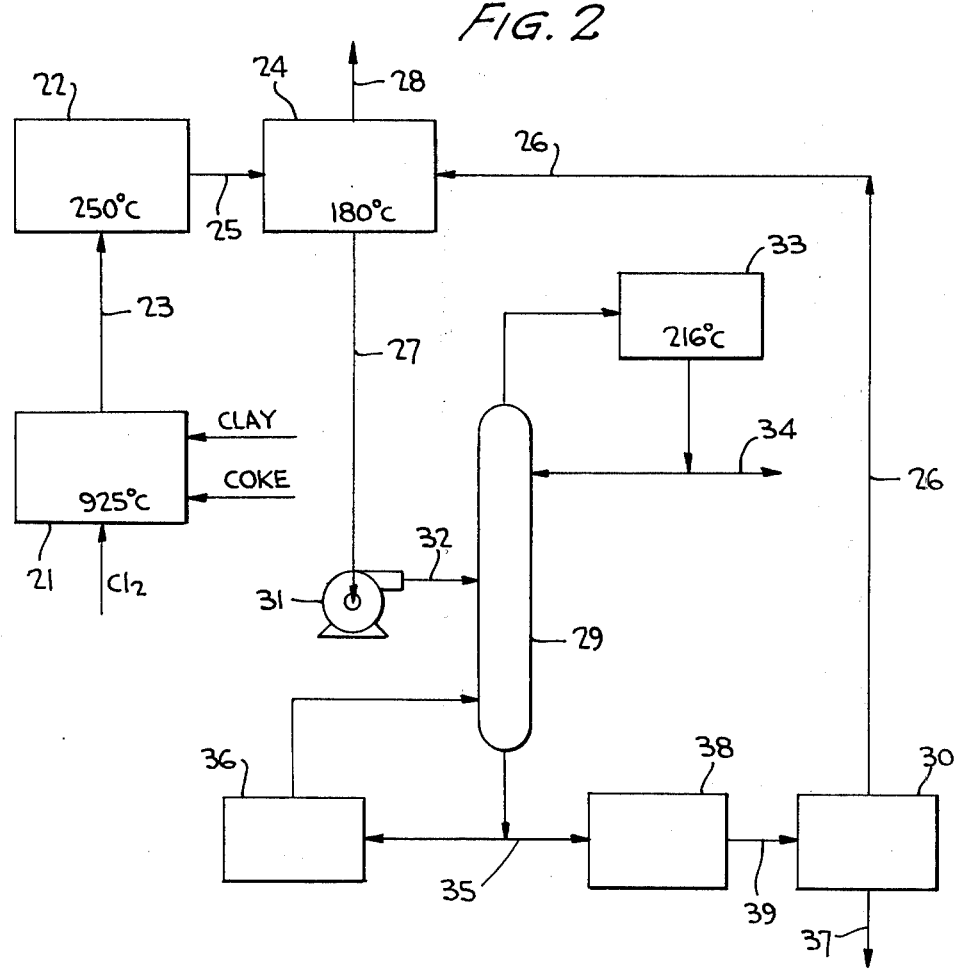

PROCESS FOR THE PURIFICATION OF ALUMINUM CHLORIDE

RELATED APPLICATIONS

This application is a continuation-in-part of U.S. patent application Ser. No. 422,846 filed Dec. 7, 1973, now U.S. Pat. No. 3,938,969.

BACKGROUND OF THE INVENTION

As explained in our earlier filed copending patent application, aluminum chloride is an important chemical which has many industrial applications. For example, it is used as a catalyst in organic chemical syntheses and in petroleum refining. It is also used in dyestuffs and as a nulceating agent for titanium dioxide pigments. In addition, recent technological developments have signaled the potential need for large tonnages of aluminum chloride in processes for the production of aluminum metal. In such processes, an aluminous material is first chlorinated to provide $AlCl_3$, after which the $AlCl_3$ is purified and subsequently reduced by electrolytic or chemical means to give aluminum metal. Such a chemical reduction is effected, for instance, by the Toth Procees in which manganese metal is employed to reduce aluminum chloride to give aluminum metal and magnese chloride. The manganese chloride is converted to manganese metal and chlorine which are recycled. The Toth Process is described in the following U.S. Pat. Nos. 3,615,359; 3,615,360; 3,677,742; 3,713,809 and 3,713,811; inter alia.

In many of these uses of $AlCl_3$, contamination of the $AlCl_3$ with iron chloride and other chlorides is deleterious because of, for example, discloration in dyeing, the variation of pigment reaction in catalysis and the presence of impurities in aluminum metal.

Current domestic production of $AlCl_3$ is carried out exclusively through direct chlorination of metallic aluminum of high enough purity that purification of the $AlCl_3$ is generally unnecessary. However, methods for production of $AlCl_3$ whic employ aluminum metal would obviously not be of use in processses for the production of aluminum. A more economical means for producing aluminum chloride from carbo-chlorination of an aluminous material would be required. Such a process would also be far more economical than production from aluminum, particularly if economical methods were available for purification of the $AlCl_3$. Such materials for chlorination may be high purity, but expensive, e.g. alumina made by the Bayer Process. Alternately, an aluminous ore such as bauxite or clay may be employed, and these materials may be directly carbo-chlorinated following calcination. In the latter case, however, vapors produced during chlorination contain not only $AlCl_3$ but also volatile chlorides of certain impurities commonly present in the ore, such as ferric chloride, titanium tetrachloride, and silicon tetrachloride. For example, a typical analysis of Georgia kaolin clay, Jamaican bauxite, and a ferruginous bauxite is given below and each of the listed metallic components would appear as chloride vapors in the product formed in carbo-chlorination.

| COMPONENT | WEIGHT PERCENT | | |
|---|---|---|---|
| | KAOLIN CLAY | J. BAUXITE | F. BAUXITE |
| $Al_2O_3$ | 37 | 50.0 | 35.0 |
| $SiO_2$ | 45 | 3.0 | 3.0 |
| $Fe_2O_3$ | 2.5 | 20.0 | 37.0 |
| $TiO_2$ | 2.0 | 3.0 | 5.0 |
| $H_2O$ | 13 | 24.5 | 19.0 |
| Others | 0.5 | 0.5 | 1.0 |
| | 100.0 | 100.0 | 100.0 |

At atmospheric pressure, $AlCl_3$ condenses as a solid, so that conventional methods for obtaining aluminum chloride from mixed chloride vapors formed during the chlorination of calcined ores generally involve an initial condensation of the vapors directly to the solid form. Such condensation may be total condensation, but more likely it involves a fractional condensation of the less volatile aluminum chloride and ferric chloride. Titanium tetrachloride and silicon tetrachloride have significantly higher vapor pressure and consequently are readily separated by condensation at substantially lower temperatures than aluminum chloride and ferric chloride.

Commercially, the solid condensation of aluminum chloride and ferric chloride has been carried out in scraped-surface condensers such as those manufactured by Vogt Machine Co. and the Votator Division of Chemetron Corporation. An example of a commercial application of these condensers to solidify $AlCl_3$ vapors formed during the chlorination of ore is the Alchlor Process of Gulf Refining Co. The process and the condensers are described in an article by A. M. McAfee, "The Manufacture of Commercial Anhydrous Aluminum Chloride," *Ind. and Engr. Chem.*, Vol. 21, No. 7, page 670, and in U.S. Pat. No. 1,814,397. However, scraped-surface condensers are expensive pieces of equipment and require extensive maintenance. Thus capital and operating costs for this method ae extremely high.

After solidification of the aluminum chloride and ferric chloride, purified aluminum chloride is obtained by melting the solids under pressure, and by subsequent distillation to provide aluminum chloride of the desired purity. This is also a costly operation because of the high heats of fusion and vaporization of aluminum chloride (116 and 100 BTU/pound respectively) and the inefficiency of melting a solid which has been condensed from the vapor state.

Another method for obtaining purified aluminum chloride is to reduce the ferric chloride contaminant to non-volatile ferrous chloride or iron metal using aluminum metal. The aluminum chloride is then volatilized and condensed. However, this method also requires the melting of the condensed solid aluminum chloride and ferric chloride plus the added expense of the aluminum metal required to react with the ferric chloride to form aluminum chloride and iron metal.

Other prior art methods have employed titanium tetrachloride to preferentially dissolve the solidified aluminum chloride, leaving the ferric chloride in suspension to be filtered or centrifuged away. Although the solubility of aluminum chloride in titanium tetrachloride is relatively low, ferric chloride solubility is negligible with the result that a good separation is obtained. However, large quantities of titanium tetrachloride are required, thus making the recovery of aluminum chloride expensive, especially since the solid condensation of $AlCl_3$ is still necessary.

Another possibility which has not been tried commercially is to compress the mixed chloride vapors, condense these vapors directly to the liquid state, and then proceed with one or more of the previously mentioned methods to obtain purified aluminum chloride. However, because of the high temperatures involved during such compression, and the large scale of the operation that would be required, this would be a very expensive procedure.

It is an object of this invention to provide an improved process which eliminates the disadvantages of known methods of purification that use condensation of aluminum chloride vapors directly to solid form by utilizing certain unique specific solvents and unique processing conditions.

SUMMARY OF THE INVENTION

The method of this invention eliminates altogether the need for scraped-surface condensers, as well as the need for melting of the solidified aluminum chloride. Also eliminated are the need for costly high-speed gas turbines or compressors operating under hazardous corrosive conditions. In the invention claimed herein, chlorination and subsequent liquefication of the aluminum chloride formed during chlorination are allowed to proceed at atmospheric pressure, without the requirement for large quantities of solvents.

According to this invention, anhydrous aluminum chloride vapor is selectively dissolved from chloride gases leaving the chlorinator. This is accomplished by a scrubbing solvent at about atmospheric pressure. Depending on the solvent selected, the ferric chloride may also be dissolved, in which case the ferric chloride is subsequently separated from the solvent and from the aluminum chloride. If the ferric chloride is not soluble, it will ordinarily solidify to form a slurry, since the temperature of operation will normally be below the melting point of ferric chloride. The solvent is selected such that other chlorides such as $TiCl_4$ and $SiCl_4$ are not soluble or only very sparingly soluble and, as these chlorides have low boiling points, they will leave the absorption apparatus as a vapor. The aluminum chloride which has been selectively dissolved is then separated from the solvent by distillation. The aluminum chloride is separated from the iron chloride by any of various conventional methods, such as fractional rectification, fractional crystallization, filtration, centrifugation, adsorption, or the like.

The solvent in which the aluminum chloride is selectively dissolved should be one which is effective for the intended purpose as well as economically attractive. Thus the solvent should exhibit the following properties: it should have chemical and thermal stability and a volatility which is low with respect to aluminum chloride, ferric chloride, titanium chloride, silicon tetrachloride, and other metal salts which may be present in the reactor product; aluminum chlorides must be readily mutually soluble in the solvent; titanium tetrachloride and silicon tetrachloride must be relatively insoluble; and the absorbed aluminum chloride and ferric chloride should be easily separable from the solvent.

In our copending U.S. patent application Ser. No. 422,846, we disclose that the solvent employed is preferably an inorganic fused salt or fused salt mixture such as $NaAlCl_4$, $NaCl-AlCl_3$, $KCl-NaCl-AlCl_3$, $KCl-AlCl_3$, $MoCl_5-FeCl_3$, $SbCl_3-AlCl_3$, $AlBr_3$ or $SbCl_3$. In that application, we demonstrate the use of such solvents in a method for recovering aluminum chloride from a mixed chloride gas containing aluminum chloride and at least one chloride selected from the group consisting essentially of $FeCl_3$, $TiCl_4$ and $SiCl_4$ which comprises contacting said mixed chloride gas at atmospheric pressure with a liquid solvent in which aluminum chloride is soluble to dissolve the aluminum chloride, and recovering the aluminum chloride from the solvent by distillating the aluminum chloride from the solvent at a pressure sufficient to condense the aluminum chloride as a liquid. Pursuant to the present invention, we have discovered certain new solvents which when employed in the above described process realizes certain distinct advantages. These new solvents are mixtures of $NaCl-AlCl_3-FeCl_3$; $NaCl-AlCl_3-FeCl_2$; $NaCl-AlCl_3-FeCl_3-FeCl_2$; $AlCl_3-FeCl_3$; $AlCl_3-FeCl_2$; and $AlCl_3-FeCl_3-FeCl_2$. Other salts such as $KCl$, $LiCl$, $MgCl_2$, $CaCl_2$, or $BaCl_2$ could be employed in the above systems as additive or substitutes for components thereof, and with similar benefits; however, only a substantial increase in cost due to much higher materials costs which is an economic disadvantage.

The examples given below are illustrative of the type of solvent which is effective in such an operation, but are in no way meant to limit the solvents which may be employed. The unique advantages and features of these new found solvents are shown in the examples presented hereinafter. dr

BRIEF DESCRIPTION OF THE DRAWINGS

Referring to the drawings:

FIG. 1 is a schematic drawing of the general procedure to be followed in carrying out the method of the present invention;

FIG. 2 is a schematic drawing of a first embodiment of the method of the present invention;

DESCRIPTION OF THE PREFERRED EMBODIMENTS

Figure 3:
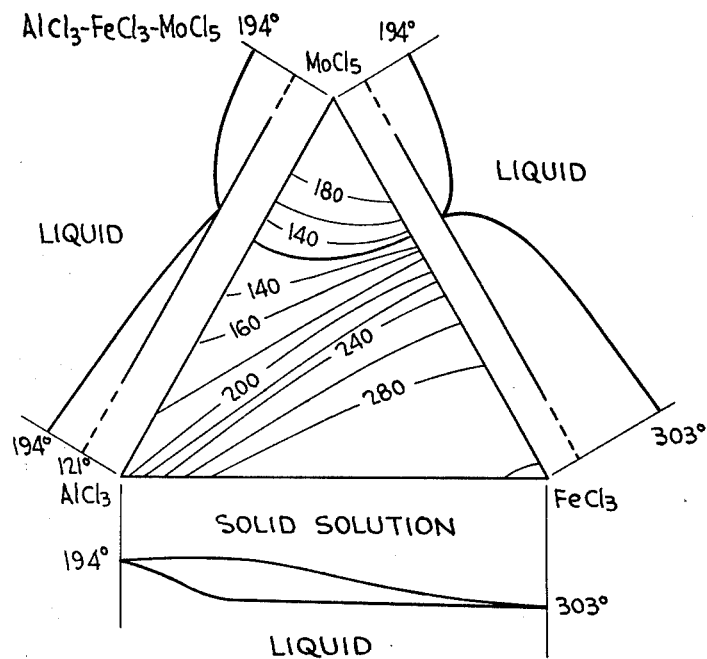
FIGS. 3 and 4 show phase diagrams of various solvents employed in the present invention.

In our copending U.S. application Ser. No. 422,846, we disclose certain preferred embodiments of our earlier invention which are presented below for comparative purposes. FIG. 1 shows a general block diagram which illustrates the commercial application to dissolve directly and subsequently recover aluminum chloride from a mixed chloride gas stream. In the chlorinator 11 an aluminuous material such as Georgian kaolin clay mixed with coke is chlorinated to produce a typical mixed chloride gas stream of the following composition:

| Component | Weight Percent |
|---|---|
| $AlCl_3$ | 42.1 |
| $FeCl_3$ | 3.4 |
| $SiCl_4$ | 37.5 |
| $TiCl_4$ | 0.8 |
| non-condensibles (i.e., CO, $CO_2$, $N_2$) | 16.2 |
| | 100.0 |

Other raw materials such as bauxite, Jamaican bauxite, low grade (ferruginous) bauxite would have different chloride compositions in the gas, but they would also be suitable.

The mixed chloride gas stream first enters a cooler 12 to reduce the temperature of the gas stream from that of chlorination to about 250° C. The cooler can serve as an excellent waste heat recovery system and enables the cooling of the stream to the minimum temperature allowable (based on dew point) for the chloride vapors entering the absorber. The dew point of the least volatile component ($FeCl_3$) is 239° C. Thus, under normal conditions, approximately 250° C is the lowest temperature at which the mixed chlorides can enter the absorber without the risk of solid condensation.

The mixed chloride gases, now at approximately 250° C, enter the absorber or scrubber 13 where the aluminum chloride in the mixed chloride is liquefied by preferential absorption into the scrubbing solvent at atmospheric pressure. The ferric chloride is either absorbed into the scrubbing solvent or, if of limited solubility in the solvent, it will solidify to form a slurry. The more volatile chlorides such as titanium tetrachloride and silicon tetrachloride and the noncondensable gases such as CO, $CO_2$, and $N_2$ leave the absorber as gases to be separated in other operations which are not pertinent to this invention.

The chloride vapors entering the absorber or scrubber 13 are cooled to remove sensible heat, latent heat of condensation and heat of solution and scrubbed to remove the $AlCl_3$ and $FeCl_3$ components. The absorber 13 is a conventional commercial apparatus used for contacting a liquid and a gas stream continuously. For example, the absorber 13 may be a tower filled with solid packing material, an empty tower into which liquid is sprayed, or a tower containing a number of bubble-cap or sieve plates. It may be a wetted wall column, a stirred vessel or other mechanically aided device. Ordinarily the gas and liquid streams flow countercurrently through the absorber 13 in order to obtain the greatest rate of absorption, although this is not required. Adequate contact of the mixed chloride vapors with the liquid solvent must be obtained with removal of heat of condensation and sensible heat sufficient to prevent an excessive temperature of the solvent.

The liquid 15 leaving the scrubber 13 and entering the recovery system 14 is enriched in $AlCl_3$ and $FeCl_3$, whereas the gases 16 leaving the scrubber 13 are saturated with the solvent which, if desired, can be recovered by cooling and condensation and returned to the absorber 13. The function of the recovery system 14 is to reclaim the solvent for recycle to the scrubber 13 via stream 19 and to obtain purified $AlCl_3$ ($FeCl_3$-free) as a liquid 17 in one of the aforementioned procedures with $FeCl_3$ being recovered as a separate component 18. In the examples given below, distillation has been used to separate pure $AlCl_3$, with crystallization or filtration being employed to separate the $FeCl_3$. Distillation is generally carried out by heating the $AlCl_3$-containing solvent to a temperature of about 280° to 450° C, depending upon the pressure employed. Distillation at pressures of at least 3 atmospheres is desirable for reasons to be discussed below.

The following comparative examples (1 through 4) are presented as illustrative of the invention disclosed in our copending U. S. application Ser. No. 422,846 and over which the instant invention represents an improvement.

EXAMPLE 1

In the embodiment of U. S. application Ser. No. 422,846 as shown in FIG. 2, a process flow diagram is provided of a procedure in which a binary liquid mixture of molybdenum pentachloride and ferric chloride is used to liquefy $AlCl_3$ at atmospheric pressure. The flow diagram also shows how the $AlCl_3$ is economically recovered and the $MoCl_5$-$FeCl_3$ solvent recycled. In this example, a solvent composition containing 40 wt. % ferric chloride and 60 wt. % molybdenum pentachloride is employed.

In FIG. 2 the raw clay is chlorinated in a reactor 21 and transported to a cooler 22 via stream 23 for cooling to 250° C as discussed previously. In this process, the mixed chlorides 23 leave the chlorinator 21 to be cooled in cooler 22 and then enter the absorber 24 as a vapor 25. In the absorber 24, the mixed chloride stream 25 containing $AlCl_3$ and $FeCl_3$ from the cooler 22 is liquefied at 250° C by the liquid solvent 26 containing 40 wt. % $FeCl_3$ and 60 wt. % $MoCl_5$. The $FeCl_3$-$MoCl_5$ liquid solvent 26 enters the absorber 24 at about 88° C and the liquid 27, following absorption of $AlCl_3$ and $FeCl_3$, leaves the absorber 24 as a ternary mixture of $AlCl_3$, $FeCl_3$, and $MoCl_5$ at 180° C.

The composition of the liquid 27 leaving the absorber 24 is determined by the composition of the mixed chloride stream 25 entering the absorber 24, the composition of the solvent 26 entering the absorber 24, and the ternary phase diagram for the system $AlCl_3$—$FeCl_3$—$MoCl_5$. This phase diagram is shown in FIG. 3. Conventional material balance calculations using the mixed chloride compositions leaving the chlorinator as described in connection with FIG. 1, a 40% $FeCl_3$—60% $MoCl_5$ composition of the solvent 26, in conjunction with the phase diagram of FIG. 3 will result by calculation in the following liquid composition leaving the absorber 24 via stream 27: 40 wt. % $AlCl_3$, 35 wt. % $MoCl_5$ and 25 wt. % $FeCl_3$.

The other components of the mixed chlorides entering the absorber 24 via stream 25 leave as a vapor 28. These are the volatile chlorides such as $TiCl_4$ and $SiCl_4$ plus noncondensable gases such as CO, $CO_2$ and $N_2$.

The recovery system used with a $FeCl_3$—$MoCl_5$ solvent requires fractional distillation and fractional crystallization. The liquid leaving the absorber 24 via stream 27 is compressed by pump 31 to 4 atmospheres pressure and fed via stream 32 to a distillation column 29.

In order to separate and recover purified aluminum chloride as a liquid it is necessary to use pressures in excess of atmospheric because pure aluminum chloride does not exist as a liquid at atmospheric pressure. Aluminum chloride, at atmospheric pressure, sublimes because its normal boiling point, 181° C, is lower than its melting point, 190° C. However, at 4 atmospheres pressure, aluminum chloride boils at 216° C. Consequently it will exist as a pure liquid at temperatures between 190° C and 216° C. Thus a minimum pressure of 3 atmospheres is desired for this purpose, with 4 atmospheres pressure being preferred. Thus a distillation column operating at 4 atmospheres pressure (44 psig) will rectify pure aluminum chloride from the less volatile molybdenum pentachloride and ferric chloride components.

Figure 4:
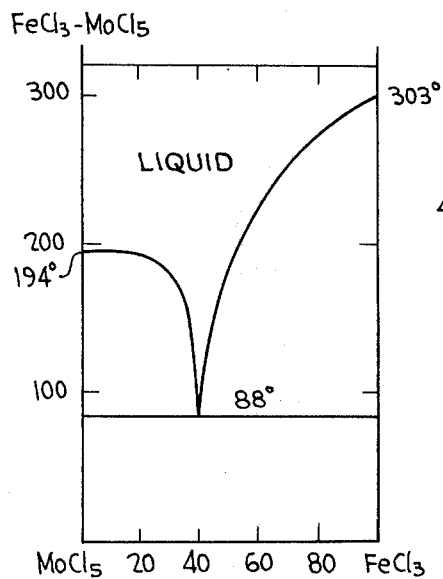

Distillation at 4 atmospheres pressure results in the condensation in condenser 33 of purified liquid aluminum chloride 34 at 216° C, and a bottoms product 35 from the reboiler 36 having a composition of 43% $FeCl_3$ and 57% $MoCl_5$ at 300° C. The bottoms 35 have been enriched in $FeCl_3$ by the $FeCl_3$ present in the mixed chlorides 25. The excess, or by-product, ferric chloride 37 is removed by cooling stream 35 to 88° C in cooler 38 and then passing the liquid 39 to a continuous crystallizer 30 to form ferric chloride crystals 37 at 88° C. The binary phase diagram for the $FeCl_3$—$MoCl_5$ system shown in FIG. 4 indicates that the liquid in equilibrium with solid ferric chloride is an eutectic composition of 40% $FeCl_3$—60% $MoCl_5$. This liquid 26 is recycled to the absorber 24.

This method has the advantage of separating the $FeCl_3$ from the $AlCl_3$ as a solid material by crystallization and filtration.

It should be noted that other alternative methods to recover aluminum chloride from the unqiue ternary mixture 27 are also available. For example, boiling the mixture at atmospheric pressure would yeild the more volatile aluminum chloride as a vapor from which it could be condensed as a solid. This latter method would not, however, be as advantageous as the method described above.

EXAMPLE 2

Figure 5:
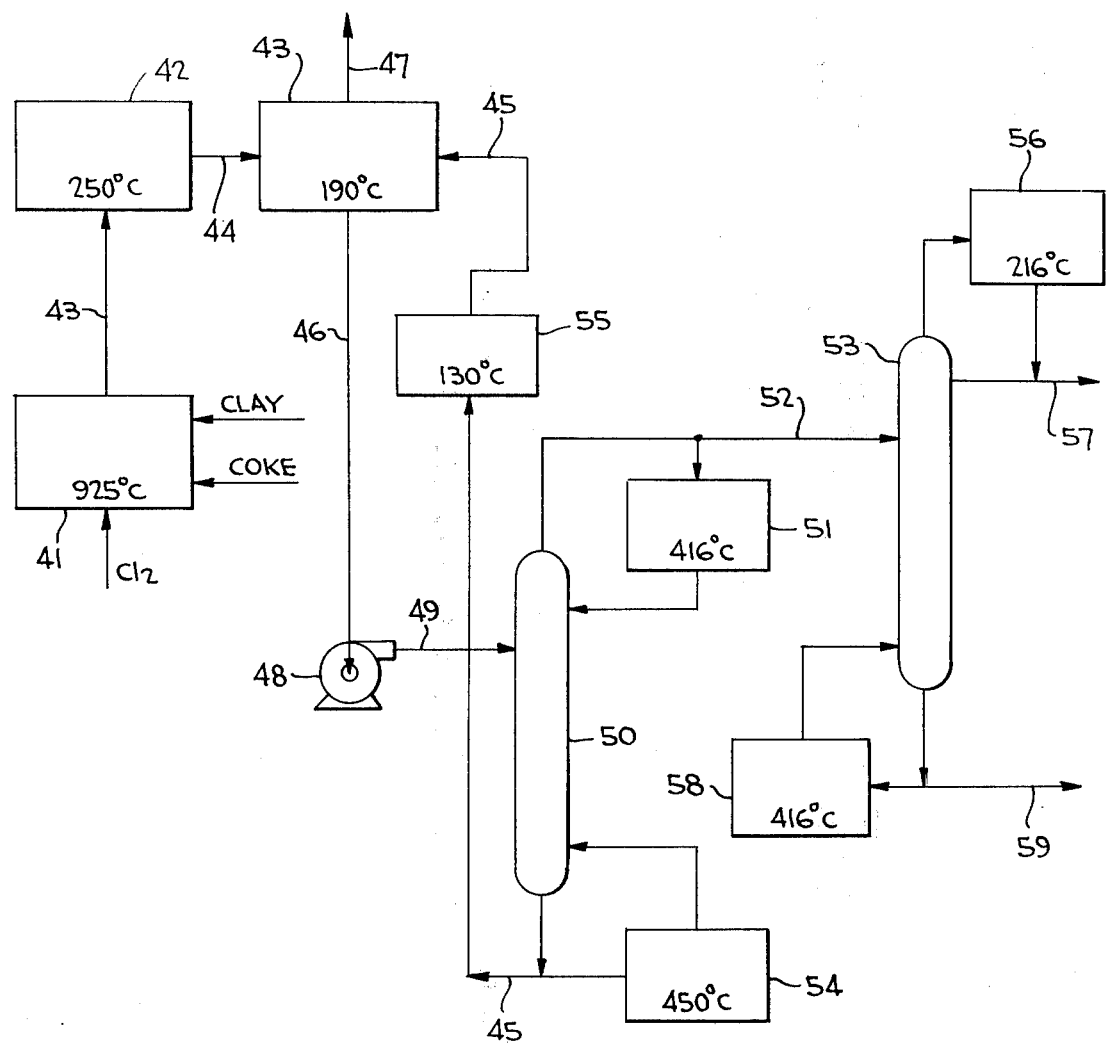
FIG. 5 is a schematic drawing of a second embodiment of the method of the present invention.

In FIG. 5 there is shown a flow diagram of a process which employs a binary mixture of sodium chloride and aluminum chloride to dissolved or liquefy $AlCl_3$ at atmospheric pressure. The $AlCl_3$ is then recovered as a pure component and the $NaaCl-AlCl_3$ solvent is recycled. In this example, a solvent composition containing 79 wt. % $AlCl_3$ and 21 wt. % NaCl is employed. However, other compositions of these two components would also be suitable. For example, $NaAlCl_4$ which is a 50—50 mole mixture of NaCl and $AlCl_3$ (70 wt. % $AlCl_3$) and also a stable compound, would make a suitable solvent.

Figure 6:
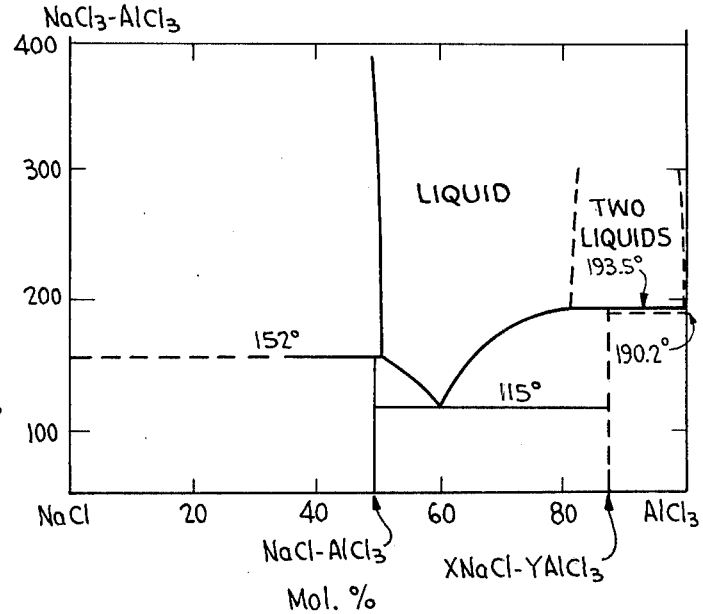
FIG. 6 shows a phase diagram for a solvent employed in the present invention.

As in Example 1 the raw clay is chlorinated in a reactor 41 and transported to a cooler 42 via stream 43 which is cooled to 250° C before entering the absorber 43 as a vapor via stream 44. In the absorber 43 the mixed chloride vapors 44 at 250° C are contacted by the liquid NaCl—$AlCl_3$ solvent 45 at 130° C. The solvent 45 preferentially liquefies the $AlCl_3$ and $FeCl_3$ from the mixed chlorides, resulting in a ternary liquid mixture 46 of $AlCl_3$, $FeCl_3$, and NaCl. Based on conventional material balance calculations and the phase diagram of FIG. 6, the composition of the liquid 46 leaving the absorber 43 is 83% $AlCl_3$, 2% $FeCl_3$ and 15% NaCl at 190° C. As in Example 1, the volatile chlorides and non-condensable gases leave the absorber 43 as vapor via stream 47.

The recovery system for separating the $AlCl_3$ and $FeCl_3$ which have been liquefied by the NaCl—$AlCl_3$ solvent requires two distillation steps. These steps are also shown in FIG. 5. Both distillations are conducted at 4 atmospheres pressure (44 psig) so that, as explained in Example 1, aluminum chloride will exist as a liquid. Thus the liquid leaving the abosrber 43 via stream 46 is compressed by pump 48 to 4 atmospheres pressure and fed via stream 49 to distillation column 50.

Distillation in column 50 results in the volatilization of the $AlCl_3$ and $FeCl_3$ absorbed from the mixed chloride stream 44. These are partially condensed in condenser 51 but the total gas-liquid stream 52 is sent to a second distillation column 53 for separation. The volatilization of $AlCl_3$ and $FeCl_3$ in column 50 is controlled by the temperature of reboiler 54. A reboiler temperature of 450° C will maintain a bottoms via stream 45 composition of 79 wt. % $AlCl_3$, 21 wt. % NaCl for recycle through cooler 55 to the absorber 43.

The binary $AlCl_3$—$FeCl_3$ mixture 52 is then separated in a second distillation column 53 at 4 atmospheres pressure. A condenser 56 operating at 216° C gives the purified aluminum chloride 57. Similarly the reboiler 58 operating at 416° C gives the by-product ferric chloride 59.

EXAMPLE 3

Figure 7:
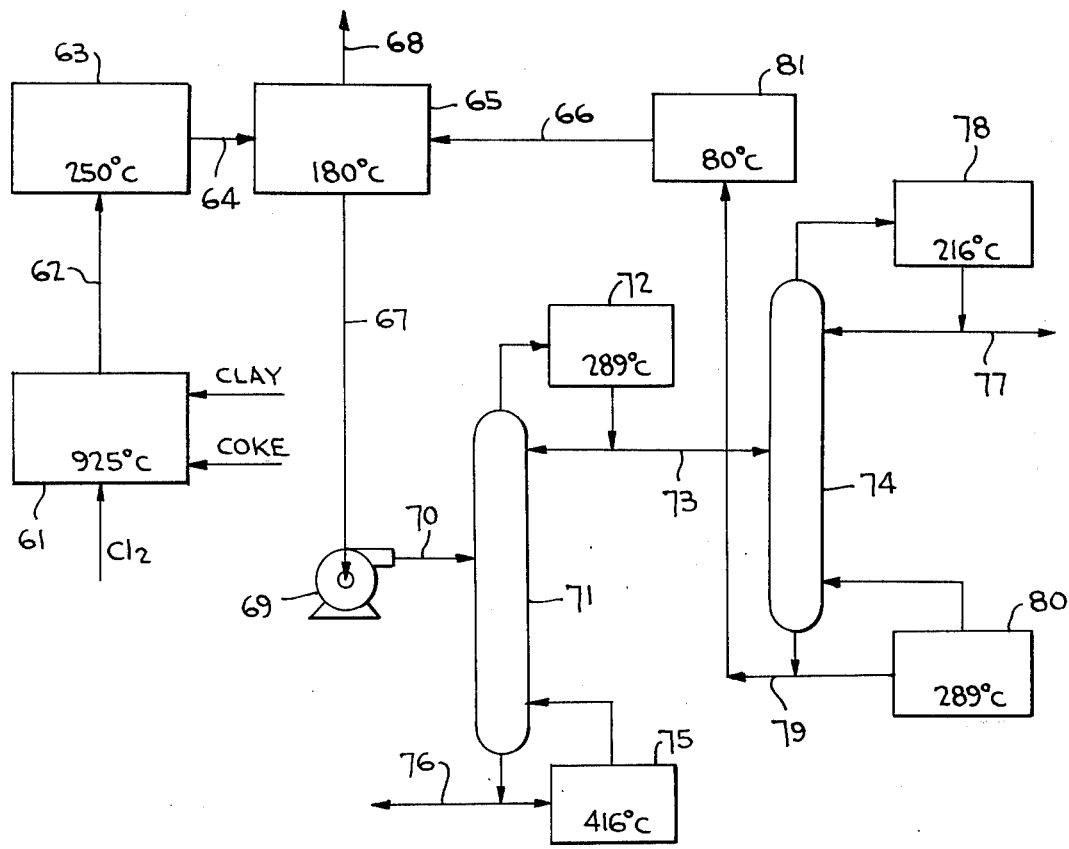
FIG. 7 is a schematic drawing of a third embodiment of the method of the present invention.

FIG. 7 shows a flow diagram of a process which employs a pure component solvent, antimony trichloride, to liquefy $AlCl_3$ at atmospheric pressure. As in previous examples the purified $AlCl_3$ is recovered by distillation and the $SbCl_3$ solvent is recycled following distillation. It should be noted that the scope of antimony chloride as an absorption solvent is not limited to applications as a pure component.

Figure 8:
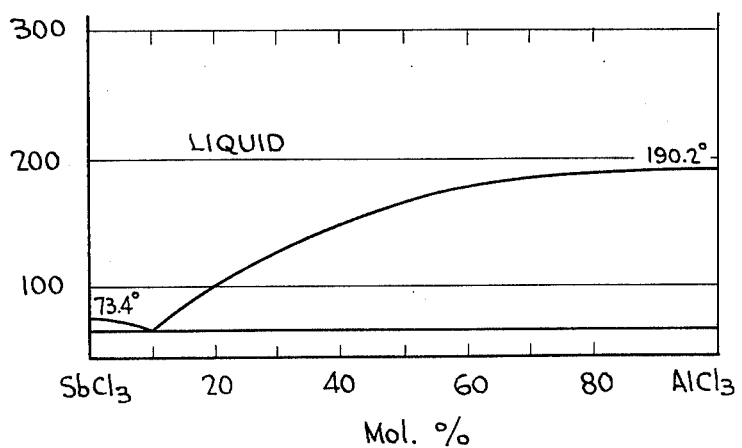
FIG. 8 shows a phase diagram for a solvent employed in the present invention.

In FIG. 7 the raw clay is carbo-chlorinated in the chlorinator 61 to produce a mixed chloride gas stream 62. The composition of the gases has been previously discussed with respect to FIG. 1. Following a cooling step in cooler 63 the mixed chloride gases 64 enter the absorber 65 at 250° C where they are counter-currently contacted with liquid antimony trichloride 66 at 80° C. The antimony trichloride 66 preferentially liquefies the aluminum chloride and ferric chloride from the mixed chlorides 64 resulting in a ternary liquid mixture 67 of $AlCl_3$, $FeCl_3$, and $SbCl_3$ at 180° C. Using standard material balance calculations and the phase diagram shown in FIG. 8, the composition of the liquid 67 leaving the absorber 65 is 28 wt. % $AlCl_3$, 2 wt. % $FeCl_3$, and 70 wt. % $SbCl_3$. As in previous examples the volatile chlorides and non-condensable gases leave the absorber 65 as vapor 68.

The recovery system to separate the aluminum chloride and ferric chloride from the antimony trichloride requires two distillation steps which are conducted at 4 atmospheres pressure (44 psig). Thus the liquid leaving the absorber 65 via stream 67 is compressed by a pump 69 and fed via stream 70 at 4 atmospheres pressure to a distillation column 71.

Distillation in column 71 results in the volatilization of $AlCl_3$ and $SbCl_3$ from $FeCl_3$. These are condensed at 289° C in a condenser 72, with the liquid condensate 73 containing 28 wt. % $AlCl_3$ and 72 wt. % $SbCl_3$ being fed to a second column 74. The bottoms 76 from column 71, which are taken-off at a reboiler 75, are liquid at 416° C.

In column 74, aluminum chloride and antimony chloride are separated at 44 psig. Liquid aluminum chloride 77 is recovered from the condenser 78 at 216° C while antimony chloride 79 for recycle is recovered from the reboiler 80 at 289° C. Following cooling in cooler 81 to 80° C, the antimony trichloride liquid is fed to the absorber 65 via stream 66.

EXAMPLE 4

A non-chloride chemical which is a suitable solvent to liquefy aluminum chloride is aluminum tribromide. It can be used as a pure component or mixed with another component such as, for example, aluminum chloride. In this example a 40 wt. % aluminum chloride, 60 wt. % aluminum bromide mixture is fed to the absorber as liquid at 80° C. Recovery of the aluminum chloride, ferric chloride, and aluminum bromide for recycle using distillation is similar to the procedure set forth in the previous examples.

The solvent recovered from the absorber in this case contains $AlCl_3$, $AlBr_3$, and $FeCl_3$. The $AlCl_3$ is recovered in the first distillation column which operates at a 325° C reboiler temperature and a 216° C condensers temperature. Part of the $AlCl_3$ is recycled to the absorber to make up the $AlCl_3$—$AlBr_3$ solvent. In a second distillation column $AlBr_3$ and $FeCl_3$ are separated using a reboiler temperature of about 320° C and a condenser temperature of about 260° C. The $AlBr_3$ is recycled to the absorber and the $FeCl_3$ is taken as by-product.

It is to be noted in the above comparative examples that of the four solvents employed, the most economical solvent employed was that of Example 2, namely, a composition of $AlCl_3$ and NaCl. However, for the particular solvent, the temperature of the reboiler 54 (FIG. 5) was much higher, viz. 450° C as compared to no greater than 416° C for the experiment of Example 3 which clearly represents a greater energy input for Example 2. This greater energy input naturally imposed an economic penalty upon the use of that particular solvent in question even though it was the least expensive solvent employed.

Pursuant to the instant invention, we have discovered certain new inexpensive solvents that can be employed more advantageously to achieve the objectives of our earlier filed copending patent application referred to above. The primary benefit of these new solvents lies in the savings in energy due to lower temperature requirements for expelling the aluminum chloride from the solvent and in the reduction of corrosion normally consistent with lower temperatures. These results were unexpected and unpredictable. These new inexpensive solvents and their method of use, together with their unique advantages and features are as disclosed in the following working Examples 5, 6, and 7 wherein all parts are by weight unless otherwise specified. The specific solvents employed in the above and following examples are not intended to limit the range of compositions of the stated solvents. A suitable solvent has a composition range that can vary within wide latitude broadly dependent on the most suitable balance between composition of solvent and of gases for economy. However, it would be evident to one skilled in the art that the composition must be such that the resulting solvent is capable of absorbing $AlCl_3$.

EXAMPLE 5

Figure 9:
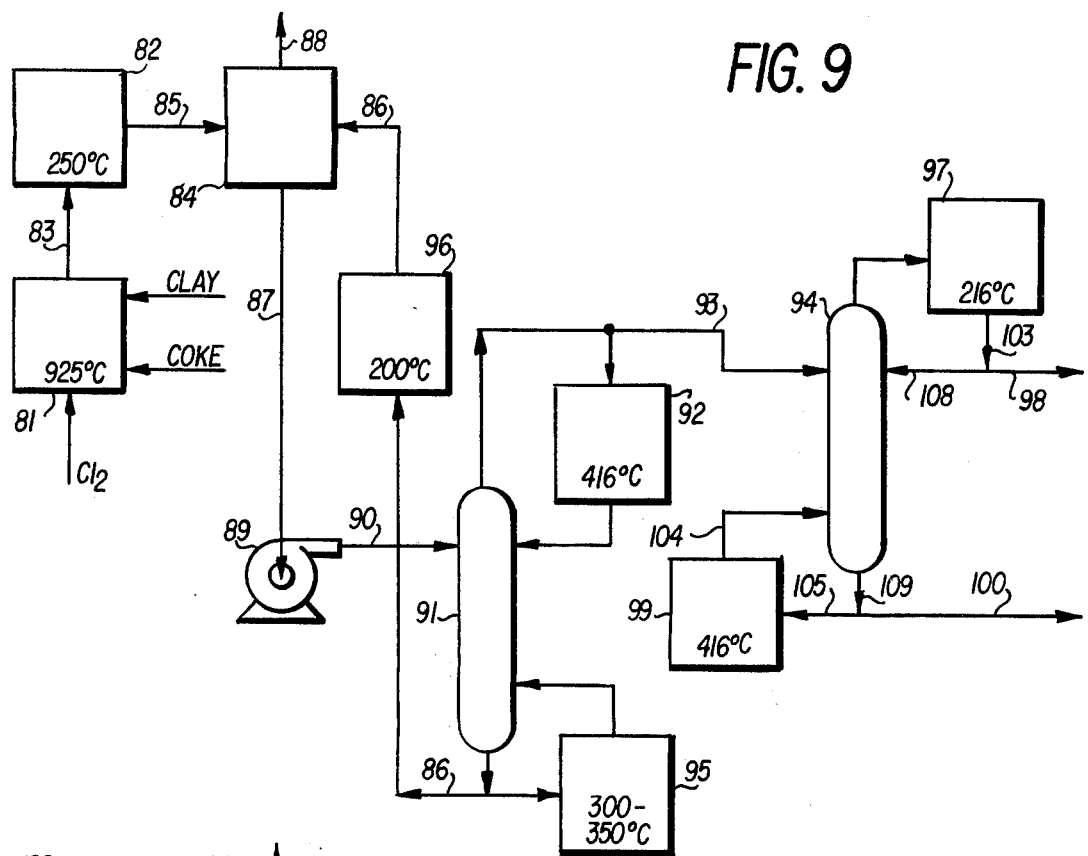
FIG. 9 is a schematic drawing of another embodiment of the method of the instant invention.

In the embodiment of the instant invention FIG. 9 shows a process flow diagram to demonstrate a procedure in which a ternary liquid mixture of NaCl—$AlCl_3$—$FeCl_3$ is used to liquefy $AlCl_3$ at atmospheric pressure. The flow diagram also shows how the $AlCl_3$ is economically recovered and the NaCl—$AlCl_3$—$FeCl_3$ solvent recycled. In this example, a solvent composition containing 72 wt. % $AlCl_3$, 17 wt. % $FeCl_3$, and 11 wt. % NaCl is employed. However, this is not to limit the range of compositions of the intended solvent. For example, $NaAlCl_4$—$NaFeCl_4$, which is a 50-25-25 mole mixture of NaCl, $AlCl_3$ and $FeCl_3$, would make a suitable solvent (this is equivalent to 28 wt. % NaCl, 32 wt. % $AlCl_3$ and 40 wt. % $FeCl_3$).

In FIG. 9 the raw clay is chlorinated in a reactor 81 and transported to a cooler 82 via stream 83 for cooling to 250° C as disclosed previously. In this process the mixed chlorides 83 leave the chlorinator 81 to be cooled in cooler 82 and then enter the absorber 84 as a vapor 85. In the absorber 84 the mixed chloride stream 85 containing $AlCl_3$ and $FeCl_3$ from the cooler 82 is liquefied at 200°-250° C by the liquid solvent 86 containing 72 wt. % $AlCl_3$, 17 wt. % $FeCl_3$ and 11 wt. % NaCl. The $AlCl_3$—$FeCl_3$—NaCl solvent 86, in this case, enters the absorber 84 at about 200° C which is above its melting point and the liquid 87, following absorption of $AlCl_3$ and $FeCl_3$, leaves the absorber 84 as a ternary mixture of $AlCl_3$, $FeCl_3$ and NaCl at about 200° C.

The composition of the liquid 87 leaving the absorber 84 is determined by the composition of the mixed chloride stream 85 entering the absorber 84, the composition of the solvent 86 entering the absorber 84, and the weight ratio of $AlCl_3$ and $FeCl_3$ in stream 85 to the total weight of solvent 86. If, for example, 1.52 weight units of $AlCl_3$ and $FeCl_3$ in stream 85 enter the absorber per unit time at 94.5% $AlCl_3$ and 5.5% $FeCl_3$, and 1.0 weight units per time of 72% $AlCl_3$, 17% $FeCl_3$ and 11% NaCl enter as solvent 86, the liquid 87 leaving the absorber would be 85wt. % $AlCl_3$, 10% $FeCl_3$ and 5% NaCl.

The other components of the mixed chloride gases entering the absorber 84 via stream 85 leave as a vapor 88. As described previously these are the volatile chlorides such as $TiCl_4$ and $SiCl_4$ plus non-condensable gases such as CO, $CO_2$, and $N_2$.

Because the solvent enters the absorber at 200° C, $AlCl_3$ and $FeCl_3$ will have vapor pressures sufficiently high to cause some carryover with the $SiCl_4$, $TiCl_4$ and other non-condensables in stream 88, in which case, a supplemental collection system might be required for recovery of the $AlCl_3$ and $FeCl_3$.

The recovery system for separating the $AlCl_3$ and $FeCl_3$ which have been liquefied by the NaCl—$AlCl_3$—$FeCl_3$ solvent requires two rectification steps. These steps are also shown in FIG. 9. Both distillations are conducted at elevated pressure (about 3 to 4 atmospheres) so that, as explained in the previous disclosure, $AlCl_3$ will exist as a liquid in the rectification steps. Thus the liquid leaving the absorber 84 via stream 87 is compressed by pump 89 to at least 3 or 4 atmospheres pressure and fed via stream 90 to rectification column 91.

Rectification in column 91 results in the volatization of the $AlCl_3$ and $FeCl_3$ absorbed from the mixed chloride stream 85. These are partially condensed in condenser 92 for reflux (if necessary for optimum operation of the column) but the total stream 93 is sent to a second rectification column 94 for final separation. The volatilization of $AlCl_3$ and $FeCl_3$ in column 91 is controlled by the temperature of reboiler 95. A reboiler temperature of 300°-350° C will maintain a bottoms (via stream 86) composition of 72 wt. % $AlCl_3$, 17 wt. % $FeCl_3$, 11 wt. % NaCl for recycle through cooler 96 to the absorber 84.

The binary $AlCl_3$—$FeCl_3$ mixture 93 is then separated in a second rectification column 94 at the same pressure as column 91. A condenser 97 operating at about 216° C gives the purified $AlCl_3$ 103, some of which is reflux 108 to the column 94 and the balance is $AlCl_3$ product 98. Reboiler 99 collects and vaporizes a part of the ferric chloride 105 from stream 109 and vaporizes it as stream 104 at about 416° C into column 94 for heat. The rest of the ferric chloride from stream 109 is taken as by-product 100.

The $AlCl_3$ purification system as described in Example 5 using a $NaCl—AlCl_3—FeCl_3$ ternary mixture as a solvent offers certain distinct advantages over the $NaCl—AlCl_3$ binary mixture disclosed in U.S. application Ser. No. 422,846 (Example 2). Although the same basic stepwise procedure is followed with the new ternary solvent as with the $NaCl—AlCl_3$ binary solvent, a significant improvement in the operating conditions of the rectification column 91 is obtained with the $NaCl—AlCl_3—FeCl_3$ system. Specifically the $NaCl—AlCl_3—FeCl_3$ system allows the reboiler 95 to operate at 300 to 350° C instead of the 450° C cited in Example 2 of the previous disclosure.

There are two major advantages to operation of this reboiler 95 at lower temperature. First, the consumption of energy is reduced and second, the severity of corrosion is also reduced. The cost of energy production or utilization in a chemical process is always a major cost favor. Consequently, any method to reduce energy consumption is an improvement. Similarly, the corrosiveness of molten chloride salts is dependent on temperature. At higher temperatures (especially above 400° C) the corrosion can be severe. Consequently any method to reduce the temperature of operation is a significant improvement. The solvent of example 5 above represents a particularly preferred embodiment because of its combination low cost of materials and good conditions.

EXAMPLE 6

Another solvent which is an improvement over the disclosures in U.S. application Ser. No. 422,846 is the $NaCl—AlCl_3—FeCl_2$ ternary. Ferrous chloride ($FeCl_2$) is substituted for ferric chloride ($FeCl_3$) in the ternary solvent of Example 5. It has the advantage of allowing operation at temperatures lower than the $NaCl—AlCl_3$ solvent system (Example 2). The advantage is similar to the $NaCl—AlCl_3—FeCl_3$ solvent system described in Example 5 except that, as the following description will show, even lower more attractive temperature levels are feasible with the ferrous chloride solvent system.

Figure 10:
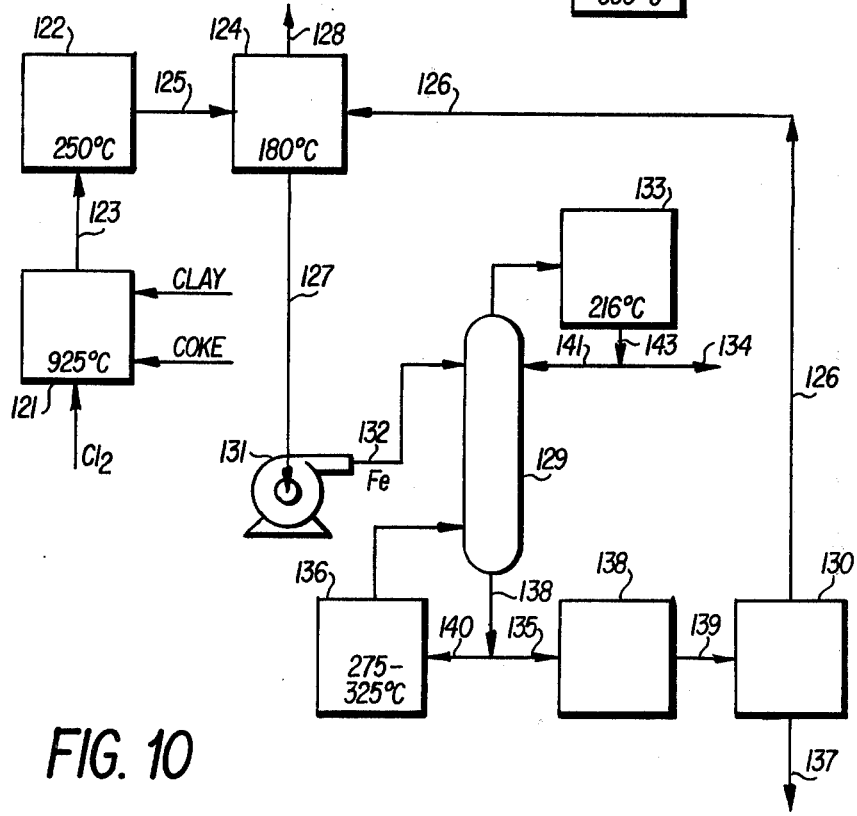
FIG. 10 is a schematic drawing of yet another embodiment of the method of the instant invention.

To demonstrate this process, FIG. 10 shows a process flow diagram for a procedure to use a liquid mixture of $NaCl—AlCl_3—FeCl_2$ to liquefy $AlCl_3$ at atmospheric pressure. The flow diagram also shows how the $AlCl_3$ is economically recovered and the $NaCl—AlCl_3—FeCl_2$ solvent recycled. In this example, a solvent composition containing 10 wt. % NaCl, 45 wt. % $AlCl_3$, and 45 wt. % $FeCl_2$ is employed.

In FIG. 10 the raw clay is chlorinated in a reactor 121 and transported to a cooler 122 via stream 123 for cooling to 250° C as discussed previously. In this process, the mixed chlorides 123 leave the chlorinator 121 to be cooled in cooler 122 and then enter the absorber 124 as a vapor 125. In the absorber 124, the mixed chloride stream 125 containing $AlCl_3$ and $FeCl_3$ from the cooler 122 is liquefied at 250° C by the liquid solvent 126 containing 10 wt. % NaCl, 45 wt. % $AlCl_3$, and 45 wt. % $FeCl_2$. The $NaCl—AlCl_3—FeCl_2$ liquid solvent 126 enters the absorber 124 at about 210° C and the liquid 127, following absorption of $AlCl_3$ and $FeCl_3$, leaves the absorber 124 as a quaternary mixture of NaCl, $AlCl_3$, $FeCl_2$ and $FeCl_3$ at about 200° C.

The composition of the liquid 127 leaving the absorber 124 is determined by the composition of the mixed chloride stream 125 entering the absorber 124, the composition of the solvent 126 entering the absorber 124, and the weight ratio of $AlCl_3$ and $FeCl_3$ in stream 125 to the total weight of solvent 126. In this example a one-to-one ratio of $AlCl_3$ and $FeCl_3$ in stream 125 (assuming 94.5% $AlCl_3$ and 5.5% $FeCl_3$) to the weight of solvent 126, will give a liquid 127 composition leaving the absorber 124 of 5% NaCl, 70% $AlCl_3$, 22% $FeCl_2$, and 3% $FeCl_3$.

The other components of the mixed chlorides entering the absorber 124 via stream 125 leave as a vapor 128. These are the volatile chlorides such as $TiCl_4$ and $SiCl_4$ plus non-condensable gases such as CO, $Co_2$ and $N_2$. As in Example 5, at 200° C the vapor pressure of $AlCl_3$ and $FeCl_3$ (plus some $FeCl_2$ that would be complexed with the $AlCl_3$) would be sufficient to cause some $AlCl_3$ and iron chlorides to be volatilized and carried-away with the $SiCl_4$, $TiCl_4$, and non-condensable gases 128. As described in Example 5, a condenser or absorber on stream 128 to cool the stream and condenser and/or absorb the aluminum and iron chlorides for recycle to the absorber 124 will be required to effect additional economy if desired.

The recovery system used with a $NaCl—AlCl_3—FeCl_2$ solvent in this example uses fractional distillation (rectification) and fractional crystallization. The liquid leaving the absorber 124 via stream 127 is compressed by pump 131 to 3 or 4 atmospheres, mixed with Fe metal to reduce the $FeCl_3$ to $FeCl_2$, and fed via stream 132 to a rectification column 129. In this example the composition of stream 132 now becomes 5% NaCl, 70% $AlCl_3$, and 25% $FeCl_2$.

The reduction of $FeCl_3$ to $FeCl_2$ is very complete and occurs by the following reaction:

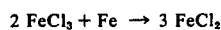

$$2\ FeCl_3 + Fe \rightarrow 3\ FeCl_2$$

Other methods are also feasible to reduce $FeCl_3$ to $FeCl_2$ in this process. For example Al metal will also react with $FeCl_3$ as follows to generate $FeCl_2$ and $AlCl_3$.

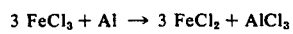

$$3\ FeCl_3 + Al \rightarrow 3\ FeCl_2 + AlCl_3$$

This is totally compatable with the system because $AlCl_3$ is one of the components and would not introduce an undesirable impurity. Another method is to heat the liquid 132 (probably in the reboiler 136 of column 129) to temperatures in excess of 350° C to decompose the $FeCl_3$ to $FeCl_2$ and $Cl_2$. The volatile chlorine will then go off with the $AlCl_3$ in column 129 and be separated in the condenser 133.

As explained earlier the separation and recovery of purified $AlCl_3$ as a liquid requires the use of pressure in excess of atmospheric. Thus rectification at 3 or 4 atmospheres pressure in column 129 results in the condensation in condenser 133 of purified liquid $AlCl_3$ 143 at about 216° C. Some of the $AlCl_3$ is refluxed 141 to the column 129 and the balance is $AlCl_3$ product 134. The bottoms product 138 from the reboiler 136 has a composition of about 10% NaCl, 42% $AlCl_3$, and 48% $FeCl_2$ at 275° to 325° C. Some bottoms product 138 is recycled 140 to the reboiler 136. The bottoms 135 have been enriched in $FeCl_2$ by the $FeCl_3$ present in the mixed chlorides 125. The excess, or by-product, ferrous chloride ($FeCl_2$) 137 is removed by cooling liquid stream 135 to about 210° C in cooler 138 and then passing the liquid 139 to a continuous crystallizer 130 to form ferrous chloride crystals 137 at 210° C. The remaining liquid in the crystallizer is the solvent. It is removed from the crystallizer and recycled 126 to the absorber 124.

An alternate method to recover $FeCl_3$ dissolved by a NaCl—$AlCl_3$—$FeCl_2$ solvent is to use two distillation steps as described in Example 5 for the NaCl—$AlCl_3$—$FeCl_3$ solvent system. In the first distillation, $AlCl_3$ and $FeCl_3$ would be distilled from the $NaCl_2$—$AlCl_3$—$FeCl_2$ solvent. Then in a second distillation, the $AlCl_3$ and $FeCl_3$ would be separated as in Example 5 (column 94 of FIG. 9).

EXAMPLE 7

A solvent which combines the components of Example 5 and Example 6 comprises NaCl, $AlCl_3$, $FeCl_3$, and $FeCl_2$. It would be equally attractive to the solvents in Examples 5 and 6. A procedure similar to that used in Example 5 (FIG. 9) would be employed in which a solvent containing NaCl, $AlCl_3$, $FeCl_3$, and $FeCl_2$ is used to absorb $AlCl_3$ and $FeCl_3$ from the mixed chloride gases leaving a chlorinator. $AlCl_3$ and $FeCl_3$ are then removed from the solvent by fractional distillation (column 91 in FIG. 9) and, in a subsequent distillation step (column 94 in FIG. 9), the $AlCl_3$ and $FeCl_3$ are separated from each other.

Other equally attractive solvents which offer certain other distinct advantages and constitute subject matter of the instant invention are the solvents of Example 5, 6, and 7 on a NaCl-free basis. Thus, those solvents would now become binary mixtures of $AlCl_3$—$FeCl_3$ (Example 5 on a NaCl-free basis); $AlCl_3$—$FeCl_2$ (Example 6 on a NaCl-free basis); and $AlCl_3$, $FeCl_3$, and $FeCl_2$ (Example 7 on a NaCl-free basis). These solvents result in the same lower temperature advantages as the solvents in Examples 5, 6, and 7.

The primary function of NaCl in the previous disclosure U.S. application Ser. No. 422,846 was to allow $AlCl_3$ to dissolve in the liquid NaCl—$AlCl_3$ solvent (Example 2) thus eliminating difficult solid phase production of $AlCl_3$ as heretofor practiced by the prior art. However, $FeCl_3$ and/or $FeCl_2$ combined with $AlCl_3$ in a binary mixture serve the same function as the NaCl. Consequently $AlCl_3$—$FeCl_3$; $AlCl_3$—$FeCl_2$; and $AlCl_3$, $FeCl_3$ and $FeCl_2$ are attractive liquid solvents at atmospheric pressure.

What is claimed:

1. In a method for recovering aluminum chloride from a mixed chloride gas containing aluminum chloride and at least one chloride selected from the group consisting essentially of $FeCl_3$, $TiCl_4$ and $SiCl_4$ which comprises contacting said mixed chloride gas at atmospheric pressure with a liquid solvent in which aluminum chloride is soluble to dissolve the aluminum chloride, and recovering the aluminum chloride from the solvent by distilling the aluminum chloride from the solvent at a pressure sufficient to condense the aluminum chloride as a liquid, the improvement comprising:
    employing as the solvent an inorganic salt mixture selected from the group consisting of NaCl—$AlCl_3$—$FeCl_3$, NaCl—$AlCl_3$—$FeCl_2$, NaCl—$AlCl_3$—$FeCl_3$—$FeCl_2$, $AlCl_3$—$FeCl_3$, $AlCl_3$—$FeCl_2$, and $AlCl_3$—$FeCl_3$—$FeCl_2$.
2. The method of claim 1 wherein the solvent has a melting point not greater than about 200° C, a boiling point greater than 250° C and is mutually soluble with aluminum chloride.
3. The method of claim 1 wherein the mixed chloride gas containing aluminum chloride orginates from the carbo-chlorination of a raw material selected from the group consisting of clay, bauxite, or ferrunginous bauxite.
4. The method of claim 1 wherein any aluminum chloride gas that is not initially separated from the mixed chloride gas by contacting with the liquid solvent is subsequently recovered in the manner of claim 1.
5. The method of claim 1 wherein $FeCl_3$ dissolved from the mixed chloride gas is essentially reduced to $FeCl_2$ for separation from the solvent.
6. The method of claim 5 wherein the $FeCl_2$ is essentially separated from the solvent by crystallization.
7. The method of claim 1 wherein the solvent comprises a ternary mixture of NaCl, $AlCl_3$, and $FeCl_3$.
8. The method of claim 1 wherein the solvent comprises a ternary mixture of NaCl, $AlCl_3$, and $FeCl_2$.
9. The method of claim 1 wherein the solvent comprises a quaternary mixture of NaCl, $AlCl_3$, $FeCl_3$, and $FeCl_2$.
10. The method of claim 1 wherein the solvent comprises a binary mixture of $AlCl_3$ and $FeCl_3$.
11. The method of claim 1 wherein the solvent comprises a binary mixture of $AlCl_3$ and $FeCl_2$.
12. The method of claim 1 wherein the solvent comprises a ternary mixture of $AlCl_3$, $FeCl_3$, and $FeCl_2$.

* * * * *